Figure 1:
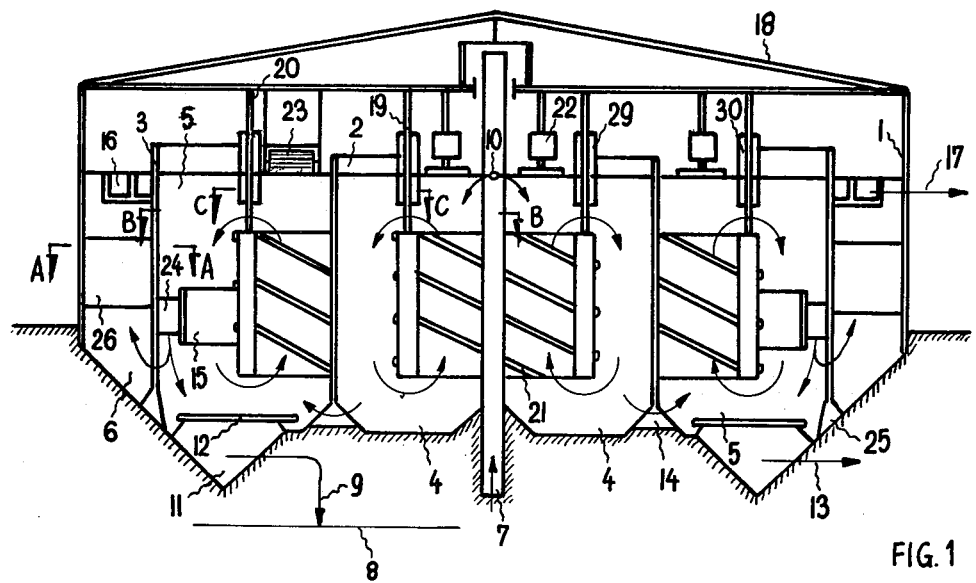

United States Patent [19]

Przybylowicz et al.

[11] 4,197,202
[45] Apr. 8, 1980

[54] BIOLOGICAL SEWAGE TREATMENT PLANT

[75] Inventors: Ryszard Przybyłowicz; Lech Narbutt; Jerzy Stepien, all of Warsaw, Poland

[73] Assignee: Przedsiebiorstwo Instalacjiprzemyslowych "Instal", Katowice, Poland

[21] Appl. No.: 926,211

[22] Filed: Jul. 19, 1978

[51] Int. Cl.² .......................... C02C 1/10; C02C 5/10
[52] U.S. Cl. .................................. **210/199; 210/202;
210/219; 210/242 A; 210/256**
[58] Field of Search ................. 210/7, 15, 151, 195 S,
210/195 SO, 197, 199, 202, 219, 256, 260, 320,
521

[56] References Cited

U.S. PATENT DOCUMENTS

| | | | |
|---|---|---|---|
| 2,963,430 | 12/1960 | Schreiber | 210/256 X |
| 3,435,954 | 4/1969 | Ohl et al. | 210/256 X |
| 3,448,861 | 6/1969 | Berk | 210/256 X |
| 3,460,677 | 8/1969 | Fifer | 210/199 |
| 3,534,857 | 10/1970 | Berk | 210/256 X |
| 3,733,263 | 5/1973 | Mandt | 210/256 X |
| 3,764,012 | 10/1973 | Bohnke et al. | 210/256 X |
| 3,890,231 | 6/1975 | LaClair et al. | 210/199 |
| 3,917,532 | 11/1975 | King | 210/260 X |
| 4,006,085 | 2/1977 | Matteson | 210/197 X |

FOREIGN PATENT DOCUMENTS

| | | |
|---|---|---|
| 2442045 | 11/1975 | Fed. Rep. of Germany . |
| 2258494 | 11/1976 | Fed. Rep. of Germany . |
| 57543 | 6/1969 | Poland . |
| 58806 | 12/1969 | Poland . |
| 60614 | 10/1970 | Poland . |
| 75207 | 2/1975 | Poland . |
| 91852 | 12/1977 | Poland . |

*Primary Examiner*—Robert H. Spitzer
*Attorney, Agent, or Firm*—Haseltine, Lake & Waters

[57] ABSTRACT

The present invention relates to a biological sewage treatment plant designed for the treatment of sewage by means of the active sediment method. The sewage treatment plant consists of a tank in the shape of a cylinder, wherein the concentric biosorption, biostabilization and settling chambers formed by vertical stationary screens coupled with each other are accommodated. The said chambers are divided into the internal and external sections formed by annular movable screens, connected to the rotary construction located above the tank. In the above mentioned construction there are suspended turbine aerators and aerating brushes. The movable screens are provided with floats with variable dipping depth consisting of vertical containers connected at a top with the gas supply pipe and, at the bottom, provided with suitable holes. The movable and stationary screens have ribs, wings and blades.

10 Claims, 11 Drawing Figures

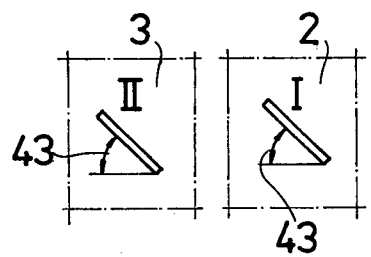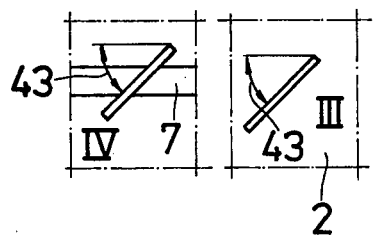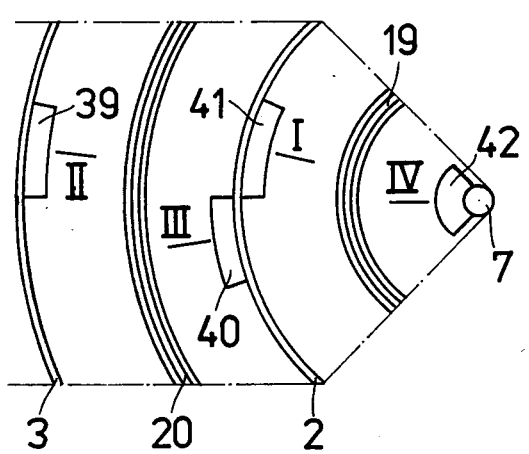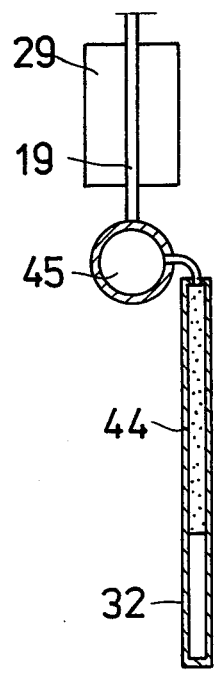

BIOLOGICAL SEWAGE TREATMENT PLANT

The present invention relates to a multi-stage biological sewage treatment plant included in one tank operating with an active sediment.

The presently known biological complex sewage treatment plant is made of concrete in the shape of two concentric tanks, wherein the external tank serves as an aerating chamber, and the internal one- as a secondary settling tank. On the walls of these concentric tanks there are platforms, wherein are located the aerating brushes. In the chamber of the secondary settling tank there is a rotary scraper and a settling container, from which the sediment is recirculated into the aerating chamber and the excessive sediment is periodically removed outside. The raw wastes are supplied to the tank via a pipe located in the external wall of the aerating chamber. The pure liquid after the treatment is drained via a pipe located under the tank and connected to the collecting trough mounted on the level of the free surface of liquid in the chamber of the secondary settling tank.

The aim of the invention is the construction of a biological sewage treatment plant, which would render it possible to obtain hydraulic parameters ensuring a high efficiency of the treatment process irrespective of the size and height of the complex sewage treatment plant.

The substance of the invention is a biological sewage treatment plant including a tank of cylindrical shape, divided concentrically by means of vertical annular stationary screens, forming chambers, and by means of movable annular screens forming sections performing various technological functions. The stationary screens are mounted in the bottom of the tank, protrude above the free surface of liquid in the tank and form, beginning from the center a biosorption chamber, a biostabilization chamber and a settling chamber. The movable screens are mounted to the rotary structure and are immersed in the biosorption chamber, and biostabilization chamber, and they divide the said chambers into internal and external sections.

The stationary screens have suitable holes under the bottom of the tank rendering possible the flow of liquid from one chamber to another from the center to the outside. The movable screens are dipped below the free surface of liquid in the biosorption and biostabilization chambers and terminate above the bottom of the said chambers. In the internal and external surface of the said movable screens there are mounted blades for guiding the liquid. In the bottom of the tank in its axis there is mounted a pipe for supply of the raw sewage to the sewage treatment plant. In the bottom of the biostabilization chamber there is a covered well for thickening the sediment. In the bottom part of the stationary screen separating the settling chamber from the biostabilization chamber an annular guide is located connected to the said screen with vertical links.

On the level of the free surface of liquid in the settling chamber there is an annular collecting trough for draining the treated sewage. On the level of liquid in the biosorption and biostabilization chambers there are floating turbine aerators, aerating brushes and other devices for introducing oxygen to the liquid. In the settling chamber, plates are located connecting the stationary screen located between the biostabilization and settling chambers to the external jacket of the tank. These plates form an acute angle with the tangent to the stationary screen and with the axis of the tank. The movable screens have vertically mounted wings in the incomplete space forming an acute angle with the tangent to the circumference of the movable screen, wherein the wings in the screen located in the biosorption chamber are inclined outwards and the wings in the screen located in the biostabilization chamber are inclined inwards. A helical line formed by blades mounted in the internal and external surface of the movable screens forms an acute angle with the axes of these screens.

On the external and internal faces of the stationary screens there are ribs forming an acute angle with the vertical axis of the tank. The movable screen walls are built of floats of variable draught consisting of vertical tubular containers, wherein in the upper part of each container there is a pipe for supply of compressed gas and in the bottom part- outlet holes.

Raw wastes together with the recirculated active sediment are introduced through the pipe installed in the axis of the tank to the biosorption chamber of the internal section.

The rotating annular screen causes an upward movement of liquid in this section and the motion of liquid around the circumference of the tank. The upward flow of liquid and its superficial turbulence is augmented by the operation of the aerating devices. The aerated liquid in the upper part of the biosorption chamber flows above the movable screen to the external section of the said chamber, wherefrom it is directed spirally downward owing to blades located on the external surface of the movable screen.

Upon reaching the bottom part of the biosorption chamber the streams of liquid flow under the movable screen to the internal section of the biosorption chamber, where the flow of the liquid streams around the circumference is directed in a proper direction due to the appropriate location of the chamber bottom. The mixture of wastes with the active sediment, after being kept for a proper period of time in the biosorption chamber, will flow outside to the next chamber under gravity forces through the holes in the stationary screen under the tank bottom during the course of inflow of the raw wastes. The flow, mixing and aeration of liquid the next chambers are effected in identically as in the first chamber. In the last chamber the clear liquid flows into the collecting trough and is drained outside the tank. The liquid with the sediment flows into the sediment thickening well, where the said sediment is thickened under gravity forces after being separated from the liquid, pumped over periodically to the raw wastes and introduced to the biosorption chamber.

Part of the sediment falling on the appropriately shaped tank bottom is introduced again to the biostabilization chamber by the streams of liquid flowing from above. The rotating annular screens cause the liquid to move along the circumference as well as in the vertical and horizontal plane in such a way that the particles of liquid aerated by aerators or aerating brushes move from the biosorption chamber through the biostabilization chambers into the settling chamber, where the specially installed plates raise the liquid, which is drained outwards as the cleared liquid through the collecting trough.

The wings located in the movable screens cause the proper direction of whirl of liquid and accelerate the flow of liquid. The movable annular screens of various diameters are interrelated to each other by means of one common arm which has a constant angular velocity. Constant vertical flow speed of liquid streams in all chambers is maintained either by the adjustment of the helix angle of the wings or by adjusting the area of the wings, whereas the inclination angle of the helix line of the wings toward the axis of rotation of the screen or the area of the said wings have different values in each chamber and are proportional to the radius of the annular movable screen. The ribs located in the stationary screens ensure the proper direction of swirling of the liquid in the sections of the chambers.

Floats located in the walls of the movable screens ensure aeration of the liquid with gas and maintain them on an optional draught.

Regular aeration and mixing of the whole contents of liquid in the chambers ensure an optimization of hydraulic parameters essential for the processes encountered in the course of treatment and for maintaining the whole mass contained in the chamber in a state of suspension in the liquid. Such kinetics of operation of the chamber enables averaging of the whole contents of the chambers and mixing of the liquid streams with the sediment introduced to the chamber with a mixture consisting of liquid and sediment present in the chamber as well as the particles of oxygen introduced to the liquid by the aerating devices.

This enables absorption of impurities contained in the sewage by the cell mass of microorganisms being the active sediment, whereas the factor stimulating the growth of microorganisms is the amount of oxygen fed by the aerating devices.

Figures 2, 3:
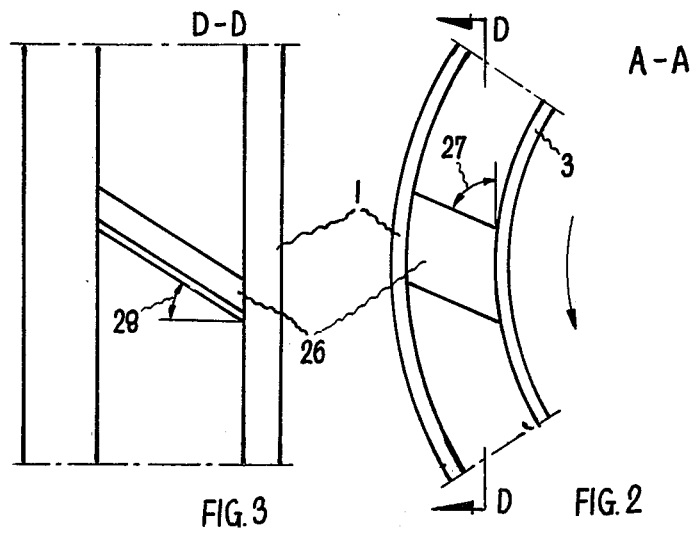

The subject of the invention is explained on an example of the embodiment shown in the drawing, wherein FIG. 1 shows the biological sewage treatment plant in vertical axial section, FIG. 2 shows a section of a segment of the circumference of the settling chamber designated with letters A—A in FIG. 1, FIG. 3 shows a vertical section of the same segment designated with letters D—D in FIG. 2.

Figure 5:
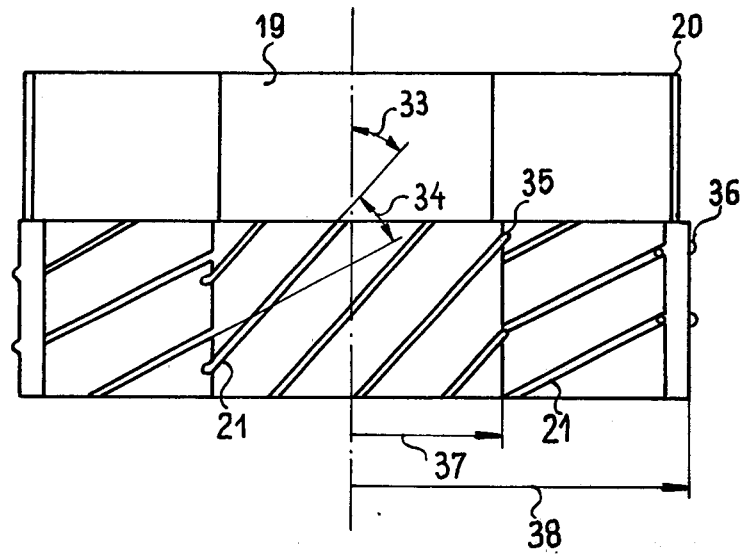
Figure 4:
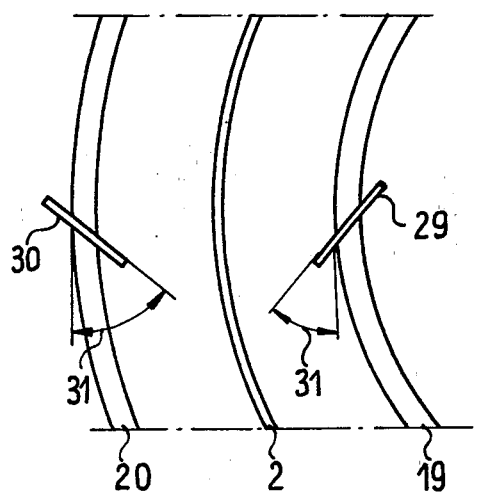

FIG. 4 shows a section of a segment of the circumference of the biosorption and biostabilization chambers together with the movable screens and the visible wings, which has been designated with letters C—C in FIG. 1, FIG. 5 shows the movable screens, wherein one of them is shown in elevational view and the other in an axial section, FIG. 6 shows a section of a segment of the circumference of the stationary and movable screens designated with letters B—B in FIG. 1

FIGS. 7, 8, 9 and 10—show the respective views in the direction shown by the arrows designated with numerals I, II, III, IV in FIG. 6, FIG. 11 shows a detail of a float section in connection with the movable screen.

The sewage treatment plant includes tank 1 of a cylindrical shape divided by means of two annular stationary screens 2 and 3 into the biosorption chamber and biostabilization chamber 4 and 5 and settling chamber 6. In the axis of the tank is installed pipe 7 in which with the help of pipe 8 raw sewage enters, and through the pipe 9 is saturated with recirculated active sediment. Pipe 7 has an overflow hole 10 in the upper part. In the bottom of the biostabilization chamber there is a well 11 for thickening the sediment covered by diaphragm 12. This well is connected to pipe 13 for removal of excess active sediment. Above the bottom in the lower part of the stationary screens 2, 3 there are holes 14 and 25 for the flow of the mixture of wastes. In the stationary screen 2 in the biostabilization chamber there is a guide 15 connected to the said screen with diaphragms 24. In the settling chamber on the level of the free surface of liquid there is an annular collecting trough 16 fixed to the stationary screen for drainage of the clear liquid through pipe 17. Above the tank there is suspended the rotary structure 18 with the annular movable screens 19 and 20 suspended in it dipped in the liquid in the biosorption and biostabilization chamber.

On the external and internal surfaces of the movable screens there are located blades 21, ensuring the vertical motion of liquid. On the surface of liquid are located turbine aerators 22 and aerating brushes 23. In the settling chamber are located plates 26 connecting the stationary screen 3 located between the biostabilization chamber and the settling chamber to the outside jacket of tank 1. These plates are situated at an acute angle 27 to the tangent to the stationary screen and at an acute angle 28 to the axis of the tank. Movable screens have over the incomplete draught space vertically mounted wings 29 and 30 which form acute angle 31 with the tangent to the movable screen, wherein the wings in the screen of the biosorption chamber are inclined to the outside and the wings in the screen of the biostabilization chamber—in the opposite direction.

Inside and outside the movable screens of radii 37 and 38 there are located blades 21 provided with suitable faces 35 and 36, wherein the said blades are arranged along a helical line and form angles 33 and 34 accordingly with the axis of rotation of the screens. On the external and internal surfaces of the stationary screens there are located ribs 39 and 40, 41 and 42 situated at an acute angle 43 to the vertical axis of the tank. The movable screening walls incorporate floats of variable draught consisting of vertical containers 44 with the upper pipe of compressed gas 45 and holes 32 in the bottom part of the containers.

We claim:

1. A biological sewage treatment plant for liquid waste comprising a cylindrical tank; vertical concentric stationary screens within said tank defining an inner biosorption chamber, a middle biostabilization chamber and an outer settling chamber; an annular collecting trough on the level of the free surface of the liquid in the settling chamber to drain the treated sewage; movable annular screens immersed in said biosorption chamber and said biostabilization chamber respectively and dividing said chambers into internal and external sections; a rotary structure attached to said movable vertical screens to permit rotary movement of the movable screens; oblique blades on the external and internal surfaces of said movable screens for guiding the liquid from the surface in a downward spiral; an annular guide; stationary vertical diaphragms connecting said annular guide to the bottom of said stationary screens; turbine aerators and aerating brushes floating in the biosorption and biostabilization chambers and connected to said rotary structure for introducing oxygen into the liquid; a well in said biostabilization chamber for thickening of the sediment; and a diaphragm covering said well.

2. The sewage treatment plant of claim 1 comprising a raw sewage inlet in the center of the biosorption chamber.

3. The sewage treatment plant of claim 1 wherein the bottom parts of the stationary screens are provided with through holes.

4. The sewage treatment plant of claim 1 further comprising in the settling chamber plates for connecting the stationary screens to the external surface of the tank, said plates forming an acute angle with the tangent to the circumference of the stationary screen and an acute angle with the axis of the tank.

5. The sewage treatment plant of claim 1 further comprising wings above annular movable screens and which form an acute angle with the tangent to the circumference of the movable screen.

6. The sewage treatment plant of claim 1 further comprising blades arranged along a helical line on the movable screens wherein the angle formed between the screen axis and said helical line is proportional to the radius of curvature of the movable screen.

7. The sewage treatment plant of claim 6 wherein the surface of the blades is proportional to the radius of curvature of the movable screen.

8. The sewage treatment plant of claim 1 further comprising ribs located on the external and internal surfaces of the stationary screens and which form an acute angle with the vertical axis of the tank.

9. The sewage treatment plant of claim 1 further comprising floats of variable draught located on the movable screens, said floats consisting of vertical containers provided with a connection to a compressed gas supply in their upper part and provided with holes in their lower part.

10. A biological sewage treatment plant for liquid waste comprising a cylindrical tank; vertical concentric stationary screens within said tank defining an inner biosorption chamber, a middle biostabilization chamber and an outer settling chamber; ribs on the interior and exterior surfaces of said stationary screens and which form an acute angle to the vertical axis of the tank; movable annular screens immersed in said biosorption chamber and said biostabilization chamber and dividing said chambers into internal and external sections; a rotary structure attached to said movable vertical screens to permit rotary movement of the movable screens; oblique blades on the external and internal surfaces of said movable screens for guiding the liquid for the surface in a downward spiral; an annular guide: stationary vertical diaphragms connecting said annular guide to the bottom of said stationary screens; turbine aerators and aerating brushes floating in the biosorption and biostabilization chambers and connected to said rotary structure for introducing oxygen into the liquid.

* * * * *